(12) United States Patent
Kuzuoka et al.

(10) Patent No.: US 10,294,875 B2
(45) Date of Patent: May 21, 2019

(54) CONTROL DEVICE FOR ADJUSTING FIRST AND SECOND FUEL RATIOS

(71) Applicant: HONDA MOTOR CO., LTD., Tokyo (JP)

(72) Inventors: Kohei Kuzuoka, Wako (JP); Tadashi Kurotani, Wako (JP); Kenji Shigetoyo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 170 days.

(21) Appl. No.: 15/214,460

(22) Filed: Jul. 20, 2016

(65) Prior Publication Data

US 2017/0022914 A1    Jan. 26, 2017

(30) Foreign Application Priority Data

Jul. 24, 2015  (JP) ................. 2015-146336

(51) Int. Cl.

| F02D 19/06 | (2006.01) |
|---|---|
| F02D 19/08 | (2006.01) |
| F02D 35/02 | (2006.01) |
| F02D 41/14 | (2006.01) |
| F02D 41/30 | (2006.01) |

(Continued)

(52) U.S. Cl.
CPC ..... *F02D 19/0607* (2013.01); *F02D 19/0628* (2013.01); *F02D 19/0665* (2013.01); *F02D 19/081* (2013.01); *F02D 35/027* (2013.01); *F02D 37/02* (2013.01); *F02D 41/0025* (2013.01); *F02D 41/0052* (2013.01); *F02D 41/1497* (2013.01); *F02D 41/3094* (2013.01); *F02P 5/152* (2013.01)

(58) Field of Classification Search
CPC ...... F02D 19/00; F02D 19/06; F02D 19/0607; F02D 19/061; F02D 19/0626–19/0631; F02D 19/081; F02D 35/027; F02D 41/0025; F02D 41/0047–41/0052; F02D 41/3094; F02D 19/08–19/088
USPC .................. 123/299, 304, 575; 701/104, 111
See application file for complete search history.

(56) References Cited

U.S. PATENT DOCUMENTS 5,526,797 A * 6/1996 Stokes ................... F02D 15/04
                                                                123/525
5,755,211 A * 5/1998 Koch .................. F02D 19/0647
                                                                123/525

(Continued)

FOREIGN PATENT DOCUMENTS

JP       2005-155469         6/2005

*Primary Examiner* — Erick R Solis
*Assistant Examiner* — Robert A Werner
(74) *Attorney, Agent, or Firm* — Mori & Ward, LLP

(57) ABSTRACT

A control device includes first and second level ratio calculators and an adjuster. The first level ratio calculator calculates a first level ratio of an amount of a first fuel stored in a first tank to a full tank capacity of the first tank. The second level ratio calculator calculates a second level ratio of an amount of a second fuel stored in a second tank to a full tank capacity of the second tank. An octane number of the second fuel is higher than an octane number of the first fuel. The adjuster adjusts a first fuel ratio of the first fuel in a supplied fuel which is supplied to an internal combustion engine and a second fuel ratio of the second fuel in the supplied fuel such that a deviation ratio of the first level ratio and the second level ratio is within a predetermined range.

20 Claims, 11 Drawing Sheets

(51) Int. Cl.
    *F02P 5/152*           (2006.01)
    *F02D 37/02*           (2006.01)
    *F02D 41/00*           (2006.01)

(56) References Cited

U.S. PATENT DOCUMENTS

| | | | | |
|---|---|---|---|---|
| 6,711,893 | B2 * | 3/2004 | Ueda | B01D 61/36 |
| | | | | 123/1 A |
| 7,647,916 | B2 * | 1/2010 | Leone | F02D 41/0025 |
| | | | | 123/25 E |
| 7,703,435 | B2 * | 4/2010 | Surnilla | F02D 19/0628 |
| | | | | 123/27 GE |
| 8,118,009 | B2 * | 2/2012 | Pursifull | F02B 43/10 |
| | | | | 123/406.31 |
| 8,590,515 | B2 * | 11/2013 | Young | F02D 41/0025 |
| | | | | 123/27 GE |
| 9,382,854 | B2 * | 7/2016 | Leone | F02D 19/0649 |
| 2015/0267630 | A1 * | 9/2015 | Magnusson | F02D 19/105 |
| | | | | 123/568.19 |

* cited by examiner

CONTROL DEVICE FOR ADJUSTING FIRST AND SECOND FUEL RATIOS

CROSS REFERENCE TO RELATED APPLICATIONS

The present application claims priority under 35 U.S.C. § 119 to Japanese Patent Application No. 2015-146336, filed Jul. 24, 2015, entitled "Control Device of Internal Combustion Engine." The contents of this application are incorporated herein by reference in their entirety.

BACKGROUND

1. Field

The present disclosure relates to a control device.

2. Description of the Related Art

In the past, as a control device of this type of internal combustion engine, a control device disclosed in, for example, Japanese Unexamined Patent Application Publication No. 2005-155469 has been known. In this control device, in order to consume a low-octane fuel and a high-octane fuel in a well-balanced manner, the consumption of these fuels is controlled as follows. That is, the level of the low-octane fuel in a first tank is detected and the level of the high-octane fuel in a second tank is detected. Moreover, a fuel level ratio which is the ratio of the level of the high-octane fuel to the level of the low-octane fuel is calculated.

Furthermore, when the fuel level ratio is higher than a predetermined upper limit, that is, in an unbalanced state in which the level of the high-octane fuel is higher than the level of the low-octane fuel, if a request to retard ignition timing for suppressing knocking of the internal combustion engine is made, instead of retarding the ignition timing, the ratio of supply of the high-octane fuel to the internal combustion engine is increased. On the other hand, when the fuel level ratio is lower than a predetermined lower limit, that is, in an unbalanced state in which the level of the high-octane fuel is lower than the level of the low-octane fuel, if a request to advance ignition timing for obtaining satisfactory combustion efficiency of the internal combustion engine is made, instead of advancing the ignition timing, the ratio of supply of the low-octane fuel to the internal combustion engine is increased.

SUMMARY

According to one aspect of the present invention, a control device for an internal combustion engine in which a first fuel stored in a first tank and a second fuel whose octane number is higher than an octane number of the first fuel, the second fuel stored in a second tank, are used in combination, the control device includes a first level ratio obtaining unit, a second level ratio obtaining unit, and an adjusting unit. The first level ratio obtaining unit obtains a first level ratio which is a ratio of a level of the first fuel to a predetermined full tank capacity of the first tank. The second level ratio obtaining unit obtains a second level ratio which is a ratio of a level of the second fuel to a predetermined full tank capacity of the second tank. The adjusting unit adjusts a first fuel ratio which is a ratio of the first fuel in a fuel which is supplied to the internal combustion engine and a second fuel ratio which is a ratio of the second fuel in the fuel which is supplied to the internal combustion engine. The adjusting unit adjusts the first and second fuel ratios such that a degree of deviation, from one of the first and second level ratios, of another of the first and second level ratios falls within a predetermined range.

According to another aspect of the present invention, a control device for an internal combustion engine, the control device includes a first level ratio calculator, a second level ratio calculator, and an adjuster. The first level ratio calculator calculates a first level ratio of an amount of a first fuel stored in a first tank to a full tank capacity of the first tank. The second level ratio calculator calculates a second level ratio of an amount of a second fuel stored in a second tank to a full tank capacity of the second tank. An octane number of the second fuel is higher than an octane number of the first fuel. The adjuster adjusts a first fuel ratio of the first fuel in a supplied fuel which is supplied to the internal combustion engine and a second fuel ratio of the second fuel in the supplied fuel such that a deviation ratio of the first level ratio and the second level ratio is within a predetermined range.

According to further aspect of the present invention, a control device for an internal combustion engine, the control device includes a first level ratio obtaining means, a second level ratio obtaining means, and an adjusting means. The first level ratio obtaining means calculate a first level ratio of an amount of a first fuel stored in a first tank to a full tank capacity of the first tank. The second level ratio obtaining means calculates a second level ratio of an amount of a second fuel stored in a second tank to a full tank capacity of the second tank. An octane number of the second fuel is higher than an octane number of the first fuel. The adjusting means adjusts a first fuel ratio of the first fuel in a supplied fuel which is supplied to the internal combustion engine and a second fuel ratio of the second fuel in the supplied fuel such that a deviation ratio of the first level ratio and the second level ratio is within a predetermined range.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE PREFERRED EMBODIMENTS

Figure 1:
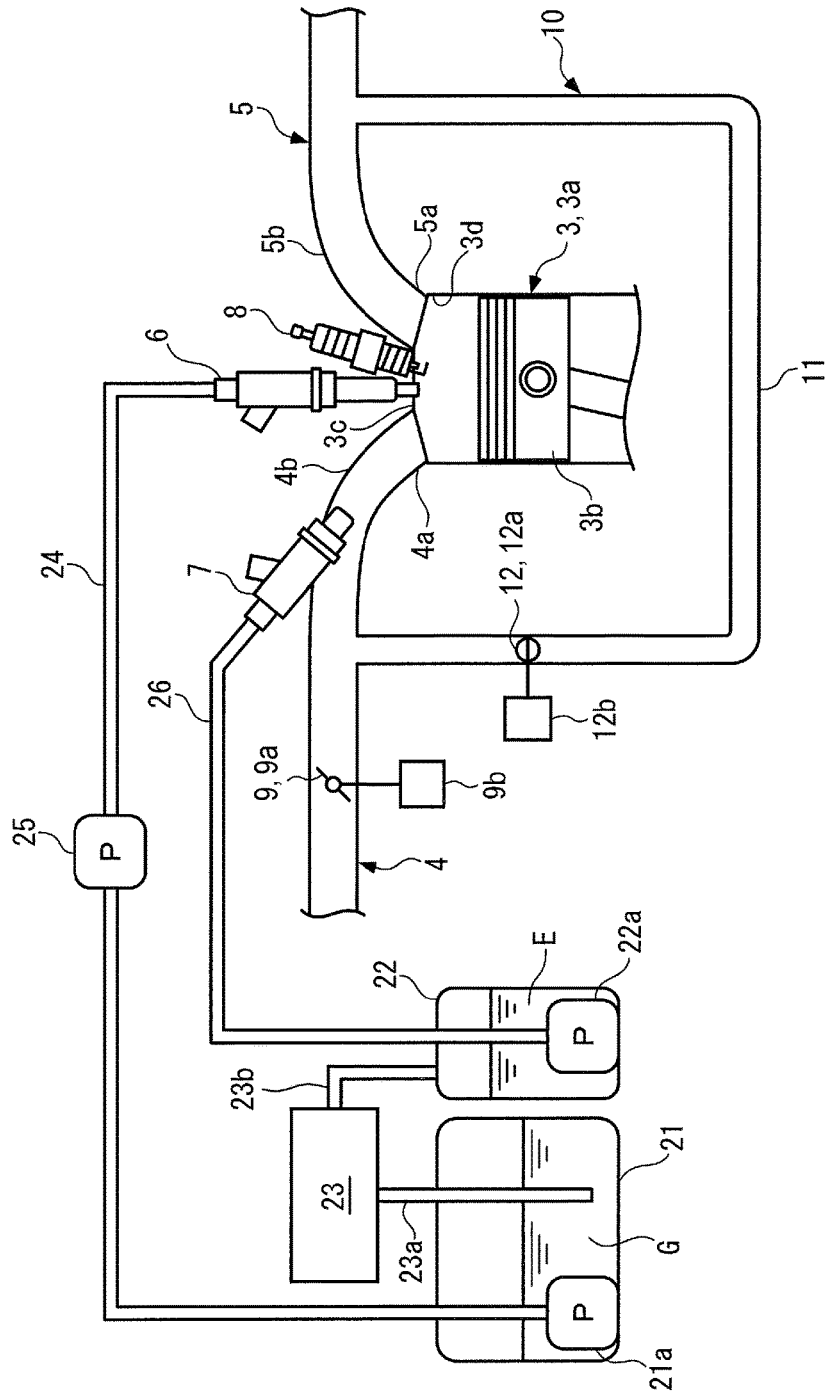
FIG. 1 is a diagram schematically depicting an internal combustion engine to which a control device according to an embodiment of the present disclosure is applied.

The embodiments will now be described with reference to the accompanying drawings, wherein like reference numerals designate corresponding or identical elements throughout the various drawings.

Hereinafter, with reference to the drawings, a preferred embodiment of the present disclosure will be described in detail. FIG. 1 depicts an internal combustion engine (hereinafter referred to as an "engine") 3 to which a control device 1 according to this embodiment is applied. The engine 3 is installed in a vehicle (not depicted in the drawing) as a power source and uses gasoline G as a low-octane fuel and ethanol E as a high-octane fuel in combination. The gasoline G is commercially available gasoline containing an about 10% ethanol component and is stored in a first fuel tank 21. The ethanol E is ethanol containing an about 60% ethanol component, the octane number thereof is higher than the octane number of the gasoline G, and the ethanol E is stored in a second fuel tank 22. In the first and second fuel tanks 21 and 22, low-pressure pumps 21a and 22a are respectively provided.

Figure 2:
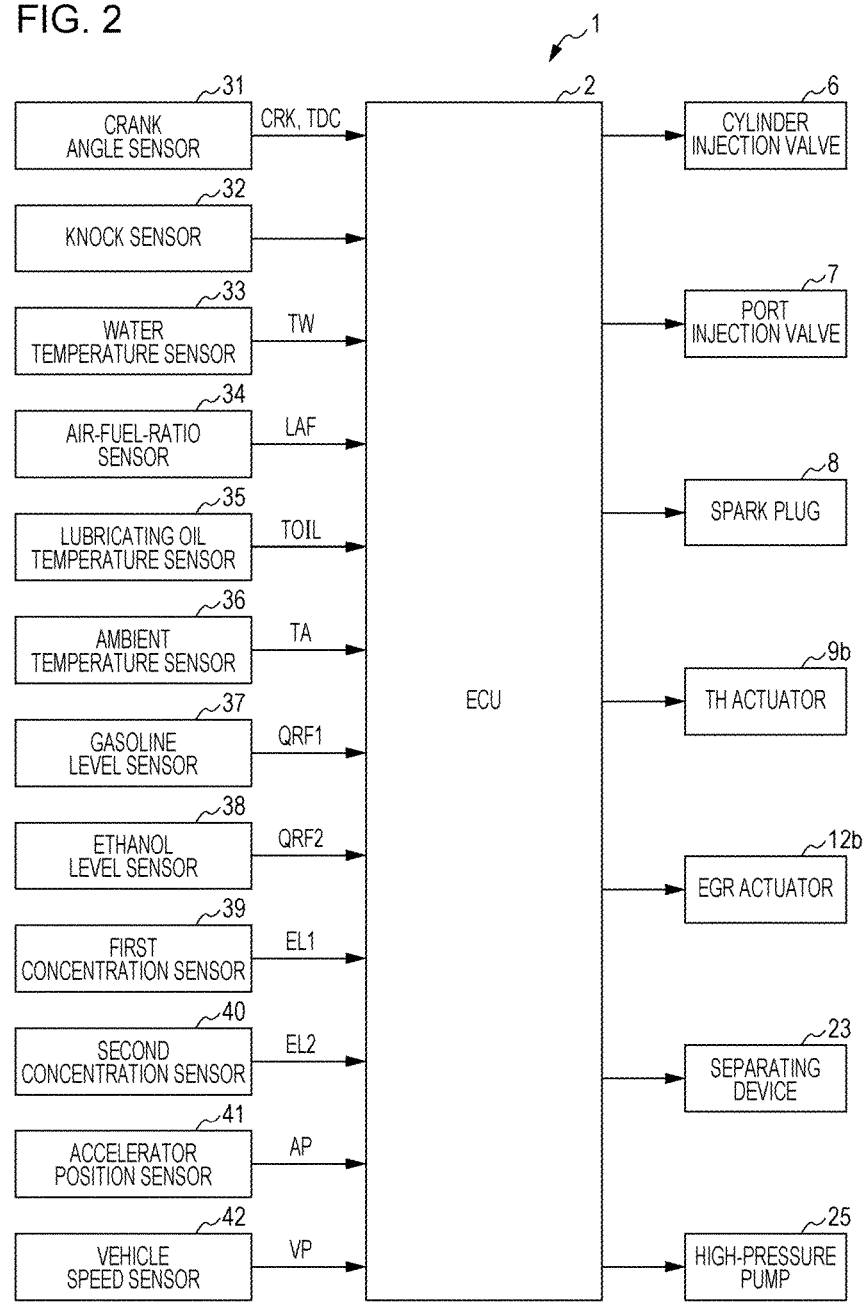
FIG. 2 is a block diagram depicting an ECU and so forth of the control device.

In this embodiment, the ethanol E is generated from the gasoline G by a separating device 23. The separating device 23 generates the ethanol E by separating the ethanol component from the gasoline G supplied via a passage 23a from the first fuel tank 21 and supplies the generated ethanol E to the second fuel tank 22 via a passage 23b. The operation performed by the separating device 23 to generate the ethanol E and supply the generated ethanol E to the second fuel tank 22 is controlled by an ECU 2, which will be described later, of the control device 1 (see FIG. 2). Incidentally, as a separation method which is performed by the separating device 23, a method using a separating film or a method using a catalyst may be appropriately adopted.

The engine 3 has, for example, four cylinders 3a (only one of the four cylinders 3a is depicted in the drawing). Between a piston 3b and a cylinder head 3c of each cylinder 3a, a combustion chamber 3d is formed. To the combustion chamber 3d, an inlet passage 4 is connected via an inlet port 4a and an inlet manifold 4b and an outlet passage 5 is connected via an outlet port 5a and an outlet manifold 5b.

Moreover, in each cylinder 3a, a cylinder injection valve 6 is provided on the cylinder head 3c and a port injection valve 7 is provided on the inlet manifold 4b. On the cylinder head 3c, a spark plug 8 for igniting an air fuel mixture of fuel and air, the air fuel mixture generated in the combustion chamber 3d, is further provided in each cylinder 3a.

Each of the cylinder injection valve 6 and the port injection valve 7 is a common valve formed of a solenoid, a needle valve, and so forth (none of which is depicted in the drawing). The cylinder injection valve 6 has a tip with a nozzle hole (not depicted in the drawing), the tip provided so as to face the combustion chamber 3d, and is connected to the first fuel tank 21 via a gasoline supply passage 24 and a high-pressure pump 25 provided at some midpoint of the gasoline supply passage 24. The port injection valve 7 has a tip with a nozzle hole (not depicted in the drawing), the tip provided so as to face the inlet port 4a, and is connected to the second fuel tank 22 via an ethanol supply passage 26.

With the above-described configuration, the gasoline G is supplied to the cylinder injection valve 6 from the first fuel tank 21 via the gasoline supply passage 24 in a state in which the gasoline G is pressurized by the high-pressure pump 25, and is injected directly into the combustion chamber 3d from the cylinder injection valve 6. The pressure of the gasoline G which is supplied to the cylinder injection valve 6 is changed by control of the operation of the high-pressure pump 25 which is performed by the ECU 2. Moreover, the ethanol E is supplied to the port injection valve 7 from the second fuel tank 22 via the ethanol supply passage 26 and is injected into the inlet port 4a from the port injection valve 7.

Furthermore, in the inlet passage 4, a throttle valve 9 is provided, and the throttle valve 9 has a valve body 9a that opens and closes the inlet passage 4 and a TH actuator 9b that drives the valve body 9a. The TH actuator 9b is formed of an electric motor, for example, and is connected to the ECU 2. The opening of the throttle valve 9 is changed by the ECU 2, whereby the amount of fresh air flowing into the cylinder 3a via the inlet passage 4 is controlled.

In addition, in the engine 3, an EGR device 10 is provided, and the EGR device 10 has an EGR passage 11 and an EGR control valve 12. The EGR passage 11 is connected to a portion of the inlet passage 4, the portion closer to a downstream side than the throttle valve 9, and to the outlet passage 5, and is provided to make the exhaust gas of the engine 3 flow back to the inlet passage 4 as EGR gas. As is generally known, as a result of the combustion temperature in the combustion chamber 3d being lowered by the backflow of this EGR gas, NOx in the exhaust gas is reduced. The EGR control valve 12 is provided in the EGR passage 11 and is formed of a valve body 12a that opens and closes the EGR passage 11, an EGR actuator 12b that drives the valve body 12a, and so forth. The EGR actuator 12b is formed of an electric motor, for example, and is connected to the ECU 2. The opening of the EGR control valve 12 is changed by the ECU 2, whereby the amount of EGR gas flowing back to the inlet passage 4 via the EGR passage 11 is controlled.

Moreover, in the engine 3, a crank angle sensor 31, a knock sensor 32, and a water temperature sensor 33 are provided, and, in the outlet passage 5, an air-fuel-ratio sensor 34 is provided. The crank angle sensor 31 outputs a CRK signal and a TDC signal, which are pulse signals, to the ECU 2 with the rotation of a crank shaft (not depicted in the drawing) (see FIG. 2). The CRK signal is output at each predetermined angle of rotation of the crank shaft (hereinafter referred to as a "crank angle", which is 1°, for example). The ECU 2 calculates the number of revolutions (hereinafter referred to as the "engine RPM") NE of the engine 3 based on this CRK signal. Furthermore, the TDC signal is a signal indicating that, in any one of the cylinders 3a, the piston 3b is located near top dead center at the start of an intake stroke. When there are four cylinders 3a as in this embodiment, the TDC signal is output at each crank angle of 180°.

The above-described knock sensor 32 is provided in a cylinder block of the engine 3 and detects knocking of the engine 3 and outputs the detection signal thus obtained to the ECU 2. The water temperature sensor 33 detects the temperature (hereinafter referred to as the "engine water temperature") TW of cooling water of the engine 3 and outputs the detection signal thus obtained to the ECU 2. The air-fuel-ratio sensor 34 detects the air fuel ratio LAF of the air fuel mixture burned in the combustion chamber 3d and outputs the detection signal thus obtained to the ECU 2.

Furthermore, in the engine 3, a lubricating oil temperature sensor 35, an ambient temperature sensor 36, and a cylinder discrimination sensor (not depicted in the drawing) are provided. The lubricating oil temperature sensor 35 detects a lubricating oil temperature TOIL which is the temperature of lubricating oil of the engine 3 and outputs the detection signal thus obtained to the ECU 2. The ambient temperature sensor 36 detects an ambient temperature TA which is the temperature of the outside air around the engine 3 and outputs the detection signal thus obtained to the ECU 2. The above-described cylinder discrimination sensor outputs, to the ECU 2, a cylinder discrimination signal which is a pulse signal for discriminating one cylinder from the other cylinders. Based on this cylinder discrimination signal and the above-described CRK signal and TDC signal, the ECU 2 calculates, for each cylinder 3a, an actual crank angular position which is the actual rotation angular position of the crank shaft. In this case, the actual crank angular position is calculated as the rotation angular position of the crank shaft with reference to the TDC signal of each cylinder 3a and is calculated as a value 0 at the time of generation of the TDC signal.

Moreover, in the first and second fuel tanks 21 and 22, a gasoline level sensor 37 and an ethanol level sensor 38 are respectively provided. The gasoline level sensor 37 detects the quantity (hereinafter referred to as the "gasoline level") QRF1 of the gasoline G stored in the first fuel tank 21 and outputs the detection signal thus obtained to the ECU 2. The ethanol level sensor 38 detects the quantity (hereinafter referred to as the "ethanol level") QRF2 of the ethanol E stored in the second fuel tank 22 and outputs the detection signal thus obtained to the ECU 2.

The ECU 2 calculates a gasoline level ratio RQRF1 by dividing the detected gasoline level QRF1 by a predetermined full tank capacity of the first fuel tank 21 (the maximum value of the gasoline G that can be stored in the first fuel tank 21). Moreover, the ECU 2 calculates an ethanol level ratio RQRF2 by dividing the detected ethanol level QRF2 by a predetermined full tank capacity of the second fuel tank 22 (the maximum value of the ethanol E that can be stored in the second fuel tank 22). As is clear from FIG. 1, the full tank capacity of the first fuel tank 21 is larger than the full tank capacity of the second fuel tank 22.

Furthermore, in the first and second fuel tanks 21 and 22, a first concentration sensor 39 and a second concentration sensor 40 are respectively provided. The first concentration sensor 39 detects the concentration (hereinafter referred to as a "first ethanol concentration") EL1 of the ethanol component contained in the gasoline G stored in the first fuel tank 21 and outputs the detection signal thus obtained to the ECU 2. The second concentration sensor 40 detects the concentration (hereinafter referred to as a "second ethanol concentration") EL2 of the ethanol component contained in the ethanol E stored in the second fuel tank 22 and outputs the detection signal thus obtained to the ECU 2.

Moreover, to the ECU 2, a detection signal indicating the amount of operation (hereinafter referred to as the "accelerator position") AP of an accelerator pedal (not depicted in the drawing) of the vehicle is output from an accelerator position sensor 41 and a detection signal indicating the vehicle speed VP of the vehicle is output from a vehicle speed sensor 42.

The ECU 2 is configured as a microcomputer formed of a CPU, RAM, ROM, an I/O interface (none of which is depicted in the drawing), and so forth. In response to the detection signals from the above-described sensors 31 to 42, the ECU 2 controls the fuel injection time and the injection timing of each of the cylinder injection valve 6 and the port injection valve 7 and the ignition timing of the spark plug 8 in accordance with a control program stored in the ROM and controls the operation of the above-described throttle valve 9, EGR control valve 12, separating device 23, and high-pressure pump 25.

Next, with reference to FIGS. 3 to 5, engine control processing which is performed by the ECU 2 will be described. This processing is processing to control the injection time of each of the cylinder injection valve 6 and the port injection valve 7 and the ignition timing of the spark plug 8 for each cylinder 3a and control the amount of EGR gas flowing back to the inlet passage 4, and is performed repeatedly in synchronism with the generation of the above-described TDC signal. First, in Step 1 ("Si" in the drawing; the same applies to the other step numbers) of FIG. 3, by searching a predetermined map (not depicted in the drawing) in accordance with the calculated engine RPM NE and the required torque TREQ of the engine 3, a basic fuel injection quantity QINJB is calculated. The required torque TREQ is calculated by searching a predetermined map (not depicted in the drawing) in accordance with the detected vehicle speed VP and accelerator position AP.

Then, by multiplying the basic fuel injection quantity QINJB calculated in Step 1 by a correction coefficient KINJ, a total fuel injection quantity QINJT is calculated (Step 2). The correction coefficient KINJ is calculated in accordance with a predetermined feedback control algorithm such that, for example, the detected air fuel ratio LAF becomes a predetermined target air fuel ratio. Moreover, the total fuel injection quantity QINJT is a target value of the sum of the injection quantity of the cylinder injection valve 6 (hereinafter referred to as the "cylinder injection quantity") and the injection quantity of the port injection valve 7 (hereinafter referred to as the "port injection quantity").

Next, by searching a predetermined map (not depicted in the drawing) in accordance with the engine RPM NE and the required torque TREQ, a required ethanol concentration EREQ is calculated (Step 3). The required ethanol concentration EREQ is a required value of the ethanol concentration of the fuel which is supplied to the inside of the combustion chamber 3d, and, in the above-described map, the larger the required torque TREQ is, the greater value to which the required ethanol concentration EREQ is set. Then, by searching a predetermined map (not depicted in the drawing) in accordance with the detected first and second ethanol concentrations EL1 and EL2 and the required ethanol concentration EREQ calculated in Step 3, a basic port injection ratio RPIB is calculated (Step 4). The basic port injection ratio RPIB is a basic value of the ratio of the port injection quantity to the sum of the cylinder injection quantity and the port injection quantity, and, in the above-described map, the basic port injection ratio RPIB is set to a positive value which is smaller than a value 1.0 such that the concentration of ethanol in the fuel which is supplied to the inside of the combustion chamber 3d becomes the required ethanol concentration EREQ.

Next, by searching a predetermined map (not depicted in the drawing) in accordance with the engine RPM NE and the required torque TREQ, a temporary EGR gas amount EGRTEM is calculated (Step 5). The temporary EGR gas amount EGRTEM is a temporary value of a target value of the amount of EGR gas flowing back to the inside of the cylinder 3a via the inlet passage 4, and, in the above-described map, the larger the required torque TREQ is, the greater value to which the temporary EGR gas amount EGRTEM is set.

Then, by searching a predetermined map (not depicted in the drawing) in accordance with the engine RPM NE and the required torque TREQ, basic ignition timing IGB is calculated (Step 6). Next, by multiplying the calculated basic ignition timing IGB by a correction coefficient KIG, temporary ignition timing IGTEM is calculated (Step 7). The correction coefficient KIG is calculated based on the detected engine water temperature TW or the like. Moreover, the temporary ignition timing IGTEM is a temporary value of a target value of the ignition timing of the spark plug 8 and, as a result of Steps 6 and 7 described above being performed, is calculated as optimum ignition timing of the spark plug 8 with which the efficiency of the engine 3 is maximized.

Next, it is determined whether or not a knock flag F_KNOCK is "1" (Step 8). The knock flag F_KNOCK indicates that knocking is occurring in the engine 3 by "1", and, as is generally known, the presence or absence of the occurrence of knocking is determined based on the detection signal of the above-described knock sensor 32.

If the result in Step 8 is NO (F_KNOCK=0) and knocking of the engine 3 is not occurring, control processing for non-knocking which will be described later is performed (Step 9) and this processing is ended. On the other hand, if the result in Step 8 is YES (F_KNOCK=1) and knocking of the engine 3 is occurring, control processing for knocking which will be described later is performed (Step 10) and this processing is ended.

Figure 3:
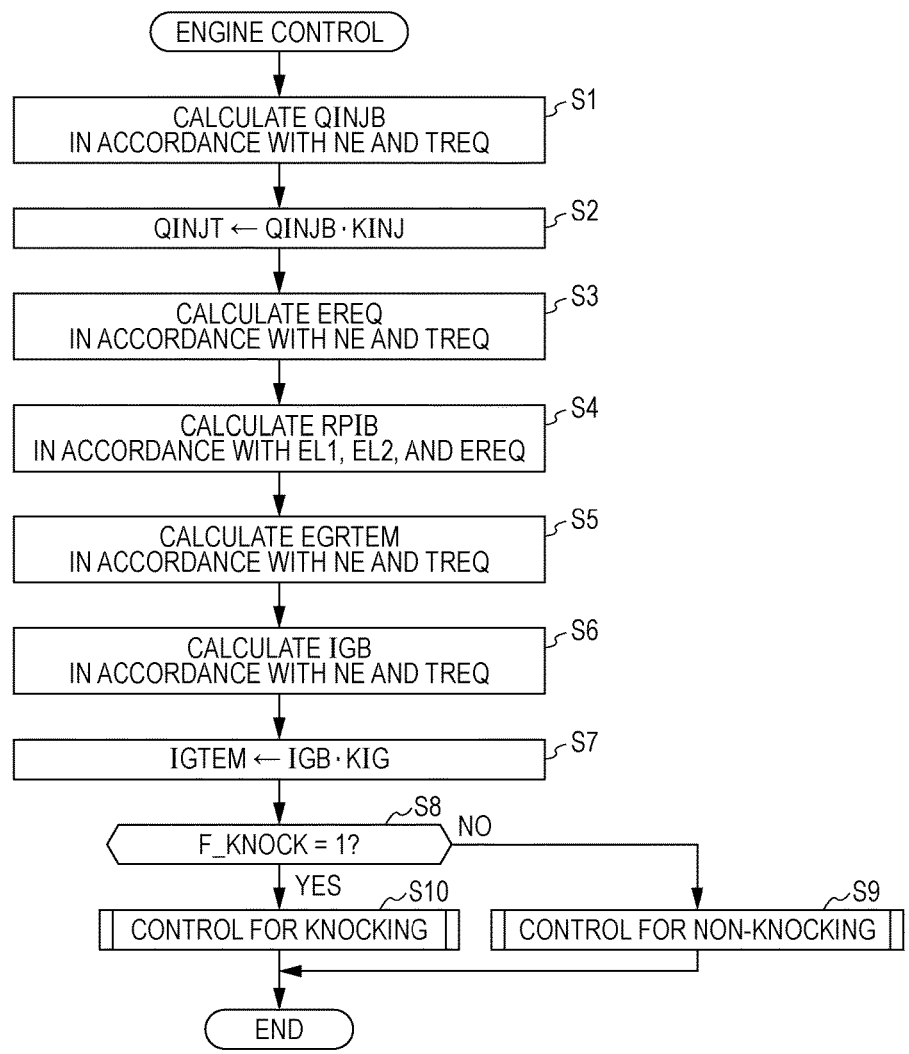
FIG. 3 is a flowchart of engine control processing which is performed by the ECU.
Figure 4:
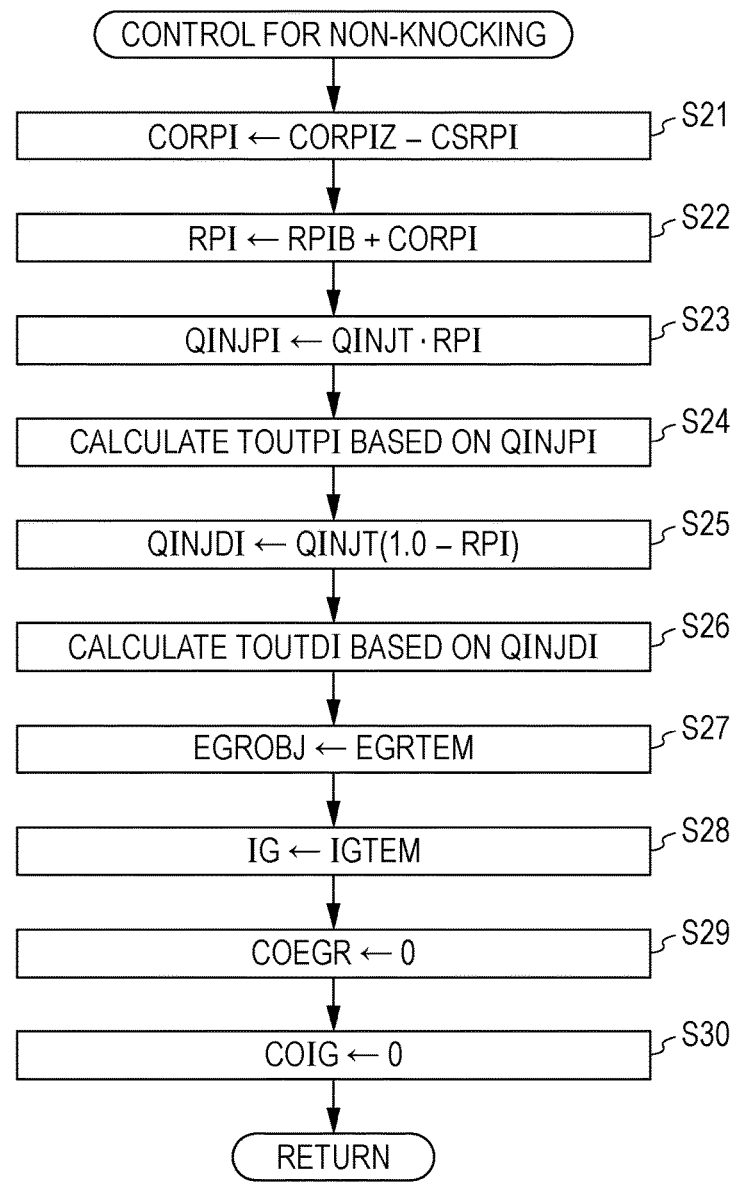
FIG. 4 is a flowchart of a subroutine of control processing for non-knocking which is performed in the engine control processing.

FIG. 4 depicts the control processing for non-knocking which is performed in Step 9 of FIG. 3. First, in Step 21 of FIG. 4, by subtracting a predetermined subtraction term CSRPI from a previous value CORPIZ of a port injection ratio correction term, a current value CORPI of the port injection ratio correction term for correcting a port injection ratio RPI is calculated. The previous value CORPIZ is set at a predetermined upper limit at the time of start of the engine 3. Then, by adding the port injection ratio correction term CORPI calculated in Step 21 to the basic port injection ratio RPIB calculated in Step 4 of FIG. 3, the port injection ratio RPI is calculated (Step 22).

Next, by multiplying the total fuel injection quantity QINJT calculated in Step 2 of FIG. 3 by the port injection ratio RPI calculated in Step 22, a target port injection quantity QINJPI is calculated (Step 23). Then, based on the calculated target port injection quantity QINJPI, a final port injection time TOUTPI which is a target value of a valve opening time of the port injection valve 7 is calculated (Step 24). When the final port injection time TOUTPI is calculated in this manner, the port injection valve 7 is opened with the port injection start timing calculated by unillustrated processing and the valve opening time thereof is controlled so as to be the final port injection time TOUTPI. As a result, the port injection quantity of the port injection valve 7 is controlled so as to be the target port injection quantity QINJPI calculated in Step 23.

In Step 25 following Step 24 described above, by multiplying the total fuel injection quantity QINJT by a cylinder injection ratio which is a value obtained by subtracting the port injection ratio RPI from a value 1.0, a target cylinder injection quantity QINJDI is calculated (QINJDI=QINJT (1.0−RPI)). Then, based on the calculated target cylinder injection quantity QINJDI, a final cylinder injection time TOUTDI which is a target value of a valve opening time of the cylinder injection valve 6 is calculated (Step 26). When the final cylinder injection time TOUTDI is calculated in this manner, the cylinder injection valve 6 is opened with the cylinder injection start timing calculated by unillustrated processing and the valve opening time thereof is controlled so as to be the final cylinder injection time TOUTDI. As a result, the cylinder injection quantity of the cylinder injection valve 6 is controlled so as to be the target cylinder injection quantity QINJDI calculated in Step 25.

In Step 27 following Step 26 described above, the temporary EGR gas amount EGRTEM calculated in Step 5 of FIG. 3 is set as a target EGR gas amount EGROBJ. When the target EGR gas amount EGROBJ is set in this manner, as a result of the opening of the EGR control valve 12 being changed based on the set target EGR gas amount EGROBJ, the amount of EGR gas flowing back to the inside of the cylinder 3a via the inlet passage 4 is controlled so as to be the target EGR gas amount EGROBJ.

In Step 28 following Step 27 described above, the temporary ignition timing IGTEM calculated in Step 7 of FIG. 3 is set as ignition timing IG. When the ignition timing IG is calculated in this manner, the ignition timing of the spark plug 8 is controlled so as to be the calculated ignition timing IG. Incidentally, the greater the ignition timing IG is, the further the ignition timing IG is retarded.

Then, in Steps 29 and 30, each of an EGR correction term COEGR and an ignition timing correction term COIG, which will be described later, is reset to a value 0, and this processing is ended.

As described above, when knocking of the engine 3 is not occurring, a correction to decrease the port injection ratio RPI is made (Steps 21 and 22). Moreover, the target EGR gas amount EGROBJ and the ignition timing IG are set at the temporary EGR gas amount EGRTEM and the temporary ignition timing IGTEM, respectively (Steps 27 and 28).

Next, with reference to FIGS. 5 and 6, the control processing for knocking which is performed in Step 10 of FIG. 3 will be described. In this processing, the port injection ratio RPI, the amount of EGR gas, and the ignition timing are controlled in such a way as to suppress knocking of the engine 3. First, in Step 41 of FIG. 5, K calculation processing for calculating a predetermined ratio K is performed. The details thereof will be described later. Then, it is determined whether or not the above-described ethanol level ratio RQRF2 is lower than a value obtained by multiplying the gasoline level ratio RQRF1 by the predetermined ratio K calculated in the above-described K calculation processing (Step 41) (Step 42, RQRF2<RQRF1·K?).

If the result in Step 42 is NO (RQRF2≥RQRF1·K), in order to suppress knocking of the engine 3, a correction to increase the port injection ratio RPI is made to increase the ratio of the ethanol E in the fuel which is supplied to the cylinder 3a. First, in Step 43, a current value CORPI of the port injection ratio correction term is calculated by adding a predetermined addition term CARPI to a previous value CORPIZ of the port injection ratio correction term. Then, an EGR correction term COEGR is set at a previous value COEGRZ thereof (Step 44) and the procedure proceeds to Step 47 which will be described later. After the engine 3 is started, at the time of the first execution of this processing, the previous value COEGRZ of the EGR correction term is set at a value 0 by the execution of Step 29 of FIG. 4.

On the other hand, if the result in Step 42 is YES (RQRF2<RQRF1·K), in order to suppress knocking of the engine 3, a correction to increase the target EGR gas amount EGROBJ is made to increase the amount of EGR gas flowing back to the inside of the cylinder 3a. First, in Step 45, a port injection ratio correction term CORPI is set at a previous value CORPIZ thereof. Then, by adding a predetermined addition term CAEGR to a previous value COEGRZ of the EGR correction term, a current value COEGR of the EGR correction term is calculated (Step 46), and the procedure proceeds to Step 47.

In Step 47, by adding the port injection ratio correction term CORPI set in Step 43 or 45 to the basic port injection ratio RPIB calculated in Step 4 of FIG. 3, the port injection ratio RPI is calculated. Then, by adding the EGR correction term COEGR set in Step 44 or 46 to the temporary EGR gas amount EGRTEM calculated in Step 5 of FIG. 3, the target EGR gas amount EGROBJ is calculated (Step 48).

Figure 6:
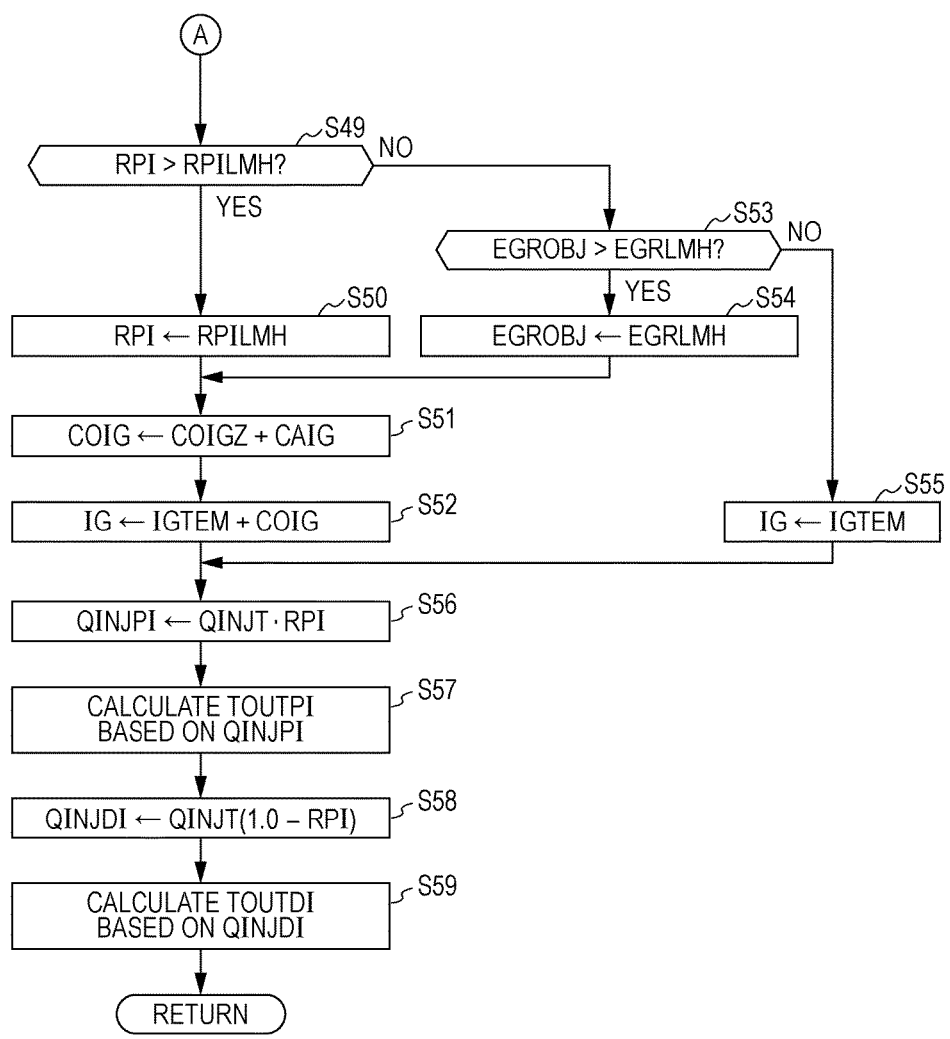
FIG. 6 is a flowchart of part of the control processing for knocking, the part continued from FIG. 5.

In Step 49 of FIG. 6 following Step 48, it is determined whether or not the port injection ratio RPI calculated in Step 47 is higher than a predetermined upper limit RPILMH (for example, a value 1.0). If the result in Step 49 is YES (RPI>RPILMH), the port injection ratio RPI is set at the upper limit RPILMH (Step 50). Then, by adding a predetermined addition term CAIG to a previous value COIGZ of an ignition timing correction term, a current ignition timing correction term COIG is calculated (Step 51). Next, by adding the ignition timing correction term COIG calculated in Step 51 to the temporary ignition timing IGTEM calculated in Step 7 of FIG. 3, the ignition timing IG is calculated (Step 52), and the procedure proceeds to Step 56 which will be described later.

On the other hand, if the result in Step 49 is NO (RPI RPILMH), it is determined whether or not the target EGR gas amount EGROBJ calculated in Step 48 is greater than an upper limit EGRLMH (Step 53). If the result is YES (EGROBJ>EGRLMH), the target EGR gas amount EGROBJ is set at the upper limit EGRLMH (Step 54), and the processing after Step 51 described above is performed. Incidentally, the upper limit EGRLMH is set in accordance with the operating conditions, such as the engine RPM NE, of the engine 3.

On the other hand, if the result in Step 53 is NO (EGROBJ≤EGRLMH), the ignition timing IG is set at the temporary ignition timing IGTEM (Step 55), and the procedure proceeds to Step 56.

In Steps 56 to 59 following Step 52 or 55 described above, in the same manner as in Steps 23 to 26 of FIG. 4, a target port injection quantity QINJPI, a final port injection time TOUTPI, a target cylinder injection quantity QINJDI, and a final cylinder injection time TOUTDI are respectively calculated. That is, in Step 56, by multiplying the total fuel injection quantity QINJT calculated in Step 2 of FIG. 3 by the port injection ratio RPI set (calculated) in Step 47 or 50, the target port injection quantity QINJPI is calculated. Then, based on the calculated target port injection quantity QINJPI, the final port injection time TOUTPI is calculated (Step 57), and, by multiplying the total fuel injection quantity QINJT by a cylinder injection ratio which is a value obtained by subtracting the port injection ratio RPI set in Step 47 or 50 from a value 1.0, the target cylinder injection quantity QINJDI is calculated (Step 58, QINJDI←QINJT(1.0−RPI)). Next, based on the calculated target cylinder injection quantity QINJDI, the final cylinder injection time TOUTDI is calculated (Step 59), and this processing is ended.

Figure 5:
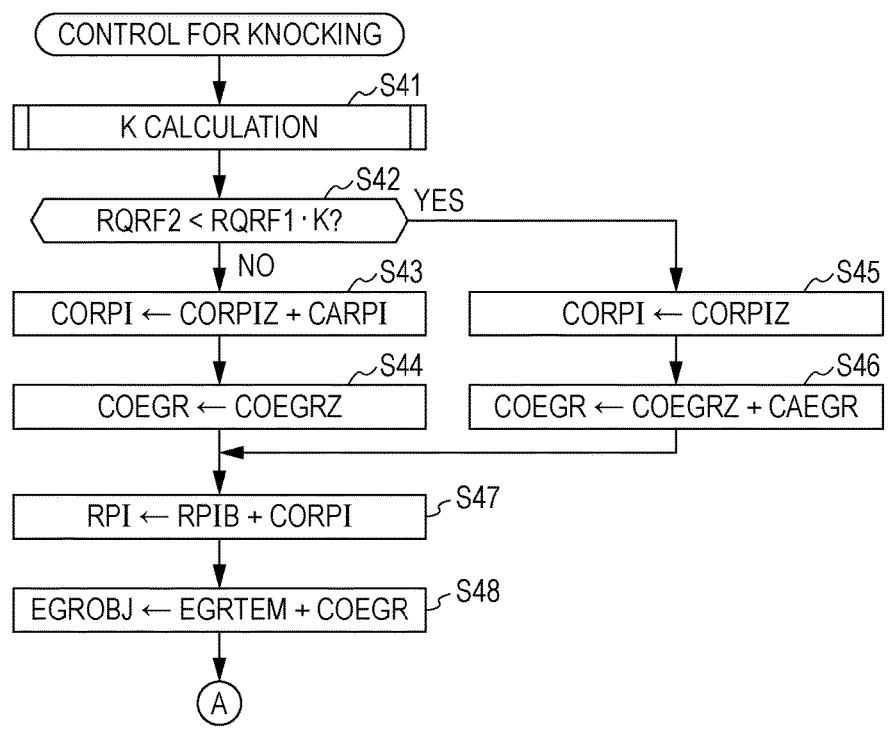
FIG. 5 is a flowchart of a subroutine of control processing for knocking which is performed in the engine control processing.
Figure 7:
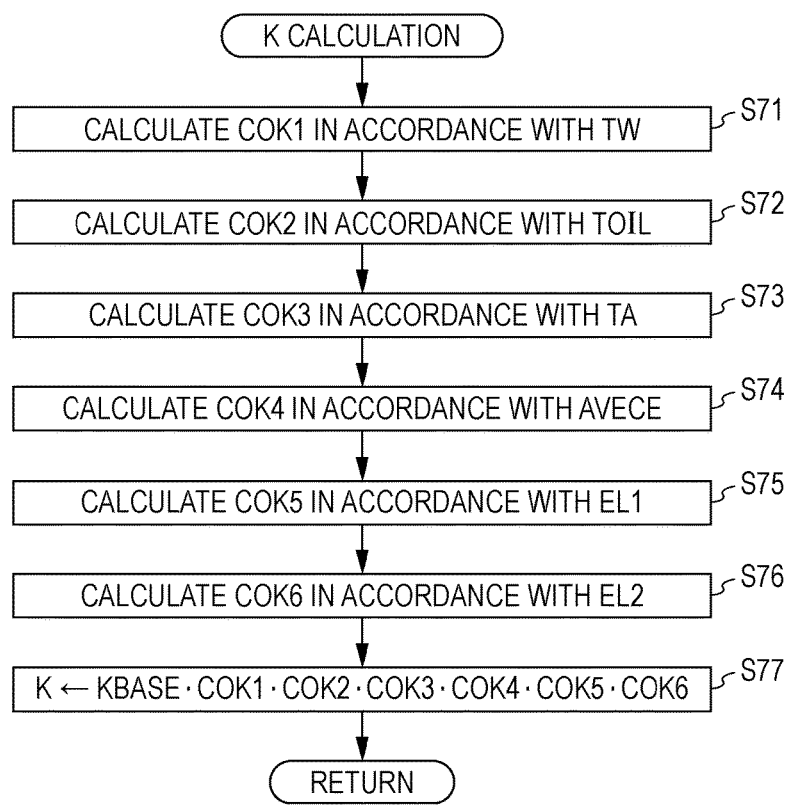
FIG. 7 is a flowchart of a subroutine of K calculation processing which is performed in the control processing for knocking.
Figure 10:
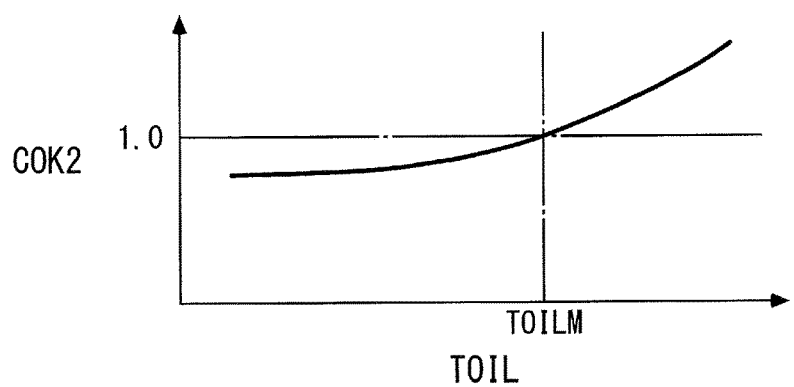
FIG. 10 is an example of a map for calculating a second correction coefficient.
Figure 11:
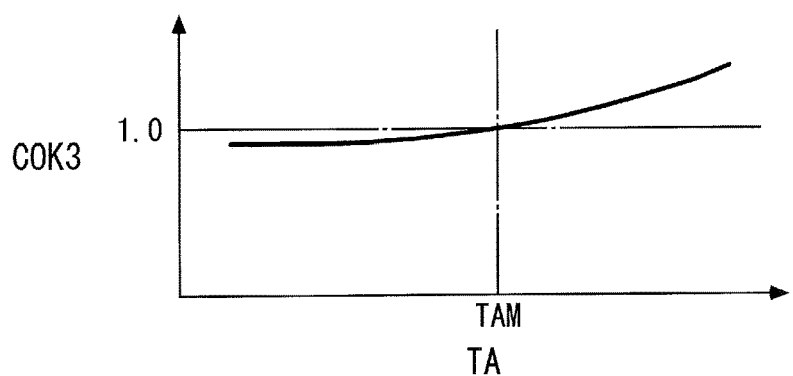
FIG. 11 is an example of a map for calculating a third correction coefficient.

Moreover, FIG. 7 depicts the K calculation processing which is performed in Step 41 of FIG. 5. In Steps 71, 72, and 73 of FIG. 7, a first correction coefficient COK1, a second correction coefficient COK2, and a third correction coefficient COK3 are respectively calculated. The first correction coefficient COK1 is calculated by searching a map depicted in FIG. 9 in accordance with the detected engine water temperature TW, the second correction coefficient COK2 is calculated by searching a map depicted in FIG. 10 in accordance with the detected lubricating oil temperature TOIL, and the third correction coefficient COK3 is calculated by searching a map depicted in FIG. 11 in accordance with the detected ambient temperature TA.

Figure 9:
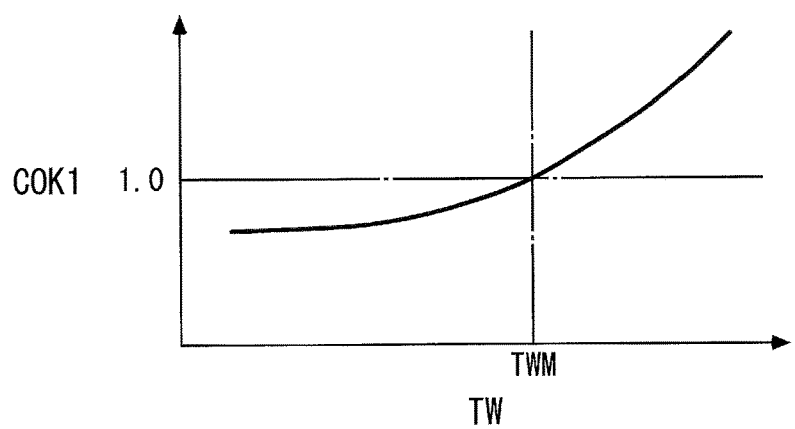
FIG. 9 is an example of a map for calculating a first correction coefficient.

In the map depicted in FIG. 9, the higher the engine water temperature TW is, the greater value to which the first correction coefficient COK1 is set. In a range in which TW is low to medium (TW≤a predetermined value TWM), the first correction coefficient COK1 is set at a value which is smaller than or equal to a value 1.0; in a range in which TW is relatively high (TW>the predetermined value TWM), the first correction coefficient COK1 is set at a value which is greater than the value 1.0. In the map depicted in FIG. 10, the second correction coefficient COK2 which is calculated in accordance with the lubricating oil temperature TOIL is set in almost the same manner as the setting of the above-described first correction coefficient COK1 which is calculated in accordance with the engine water temperature TW. This also applies to the setting of the third correction coefficient COK3 which is calculated in accordance with the ambient temperature TA in the map depicted in FIG. 11.

That is, the higher the lubricating oil temperature TOIL is, the greater value to which the second correction coefficient COK2 is set. In a range in which TOIL is low to medium (TOIL≤a predetermined value TOILM), the second correction coefficient COK2 is set at a value which is smaller than or equal to a value 1.0; in a range in which TOIL is relatively high (TOIL>the predetermined value TOILM), the second correction coefficient COK2 is set at a value which is greater than the value 1.0. Moreover, the higher the ambient temperature TA is, the greater value to which the third correction coefficient COK3 is set. In a range in which TA is low to medium (TA≤a predetermined value TAM), the third correction coefficient COK3 is set at a value which is smaller than or equal to a value 1.0; in a range in which TA is relatively high (TA>the predetermined value TAM), the third correction coefficient COK3 is set at a value which is greater than the value 1.0.

Figure 8:
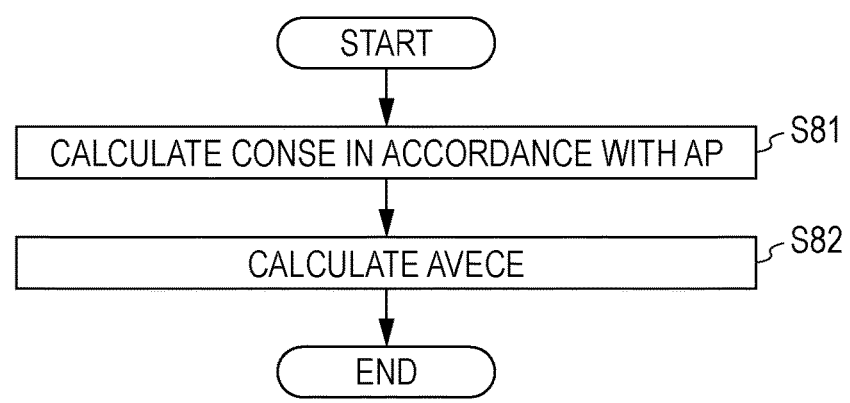
FIG. 8 is a flowchart of processing for calculating the average degree of ethanol consumption.
Figure 12:
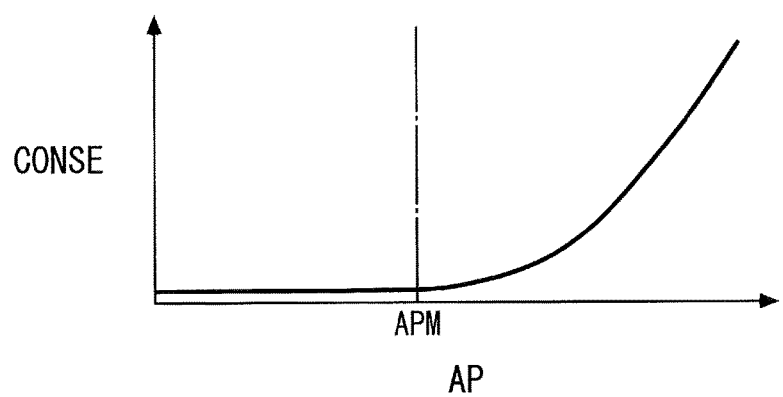
FIG. 12 is an example of a map for calculating the degree of ethanol consumption.

In Step 74 following Step 73 described above, a fourth correction coefficient COK4 is calculated in accordance with the average degree of ethanol consumption AVECE. The average degree of ethanol consumption AVECE is calculated by processing depicted in FIG. 8, and this processing is repeatedly performed with a predetermined period during the operation of the engine 3. In Step 81 of FIG. 8, by searching a map depicted in FIG. 12 in accordance with the accelerator position AP, the degree of ethanol consumption CONSE is calculated.

The degree of ethanol consumption CONSE is a parameter indicating the degree of consumption of the ethanol E in the engine 3 at each of different times. In the map depicted in FIG. 12, in a predetermined range in which the accelerator position AP is small to medium (AP≤a predetermined value APM), the degree of ethanol consumption CONSE is set at an extremely small constant value; in a range in which AP is relatively large (AP>the predetermined value APM), the larger AP is, the greater value to which the degree of ethanol consumption CONSE is set. The reason is as follows. As described earlier, the larger the required torque TREQ is, that is, the larger the accelerator position AP is, the greater value to which the required ethanol concentration EREQ is set, whereby the greater value to which the port injection ratio RPI is set. Moreover, in the predetermined range in which AP is small to medium, the required torque TREQ is small to medium and almost no knocking of the engine 3 occurs, whereby almost no ethanol E is consumed.

In Step 82 following Step 81 described above, by calculating an average of the sum total of a plurality of degrees of ethanol consumption CONSE calculated as a result of Step 81 being performed repeatedly from the start of the engine 3 to the present time, the average degree of ethanol consumption AVECE is calculated, and this processing is ended.

Figure 13:
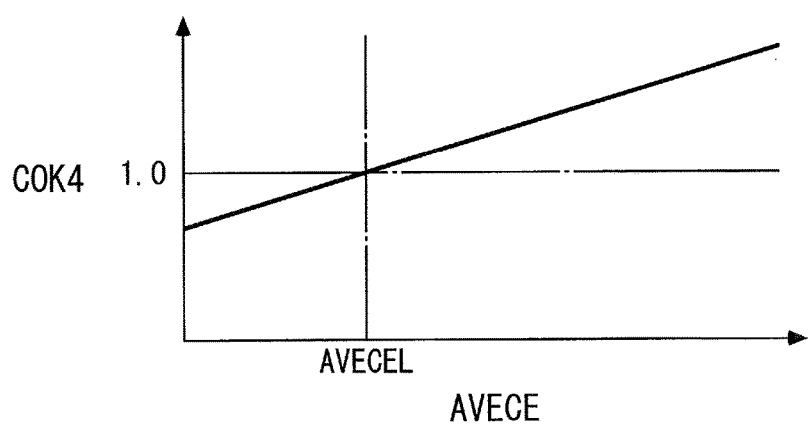
FIG. 13 is an example of a map for calculating a fourth correction coefficient.

Back in FIG. 7, in Step 74 described above, a fourth correction coefficient COK4 is calculated by searching a map depicted in FIG. 13 in accordance with the average degree of ethanol consumption AVECE calculated in Step 82. In the map depicted in FIG. 13, the higher the average degree of ethanol consumption AVECE is, the greater value to which the fourth correction coefficient COK4 is set. In a range in which AVECE is relatively low (AVECE≤a predetermined value AVECEL), the fourth correction coefficient COK4 is set at a value which is smaller than or equal to a value 1.0; in a range in which AVECE is medium to high (AVECE>the predetermined value AVECEL), the fourth correction coefficient COK4 is set at a value which is greater than the value 1.0.

Figure 14:
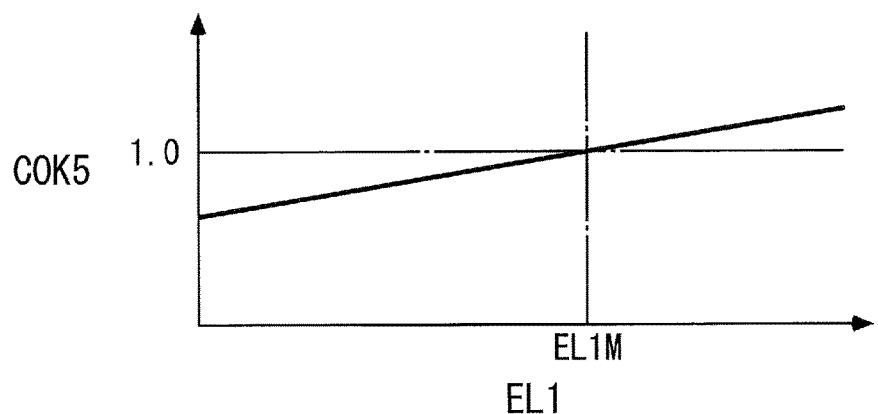
FIG. 14 is an example of a map for calculating a fifth correction coefficient.
Figure 15:
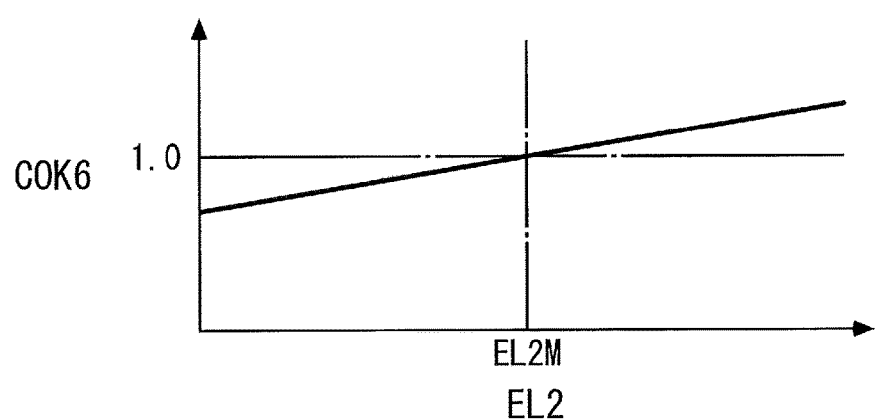
FIG. 15 is an example of a map for calculating a sixth correction coefficient.

Then, a fifth correction coefficient COK5 is calculated by searching a map depicted in FIG. 14 in accordance with the first ethanol concentration EL1 (Step 75) and a sixth correction coefficient COK6 is calculated by searching a map depicted in FIG. 15 in accordance with the second ethanol concentration EL2 (Step 76). The setting of the fifth correction coefficient COK5 which is calculated in accordance with the first ethanol concentration EL1 in the map depicted in FIG. 14 and the setting of the sixth correction coefficient COK6 which is calculated in accordance with the second ethanol concentration EL2 in the map depicted in FIG. 15 are the same as the setting of the fourth correction coefficient COK4 which is calculated in accordance with the average degree of ethanol consumption AVECE in the map depicted in FIG. 13.

That is, in the map depicted in FIG. 14, the higher the first ethanol concentration EL1 is, the greater value to which the fifth correction coefficient COK5 is set. In a range in which EL1 is low to medium (EL1≤a predetermined value EL1M), the fifth correction coefficient COK5 is set at a value which is smaller than or equal to a value 1.0; in a range in which EL1 is relatively high (EL1>the predetermined value EL1M), the fifth correction coefficient COK5 is set at a value which is slightly greater than the value 1.0. Moreover, in the map depicted in FIG. 15, the higher the second ethanol concentration EL2 is, the greater value to which the sixth correction coefficient COK6 is set. In a range in which EL2 is low to medium (EL2≤a predetermined value EL2M), the sixth correction coefficient COK6 is set at a value which is smaller than or equal to a value 1.0; in a range in which EL2 is relatively high (EL2>the predetermined value EL2M), the sixth correction coefficient COK6 is set at a value which is slightly greater than the value 1.0.

In Step 77 following Step 76 described above, a predetermined ratio K is calculated by multiplying a basic value KBASE of the predetermined ratio K by the first to sixth correction coefficients COK1 to COK6 calculated in Steps 71 to 76, and this processing is ended. The basic value KBASE is set at a value 1.0, for example.

As described above, in the control processing for knocking, if the ethanol level ratio RQRF2 is higher than or equal to a value obtained by multiplying the gasoline level ratio RQRF1 by the predetermined ratio K, in order to suppress knocking of the engine 3, a correction to increase the port injection ratio RPI is made (Step 42: NO, Steps 43 and 47). Moreover, if RQRF2 is lower than the value obtained by multiplying RQRF1 by K, a correction to increase the port injection ratio RPI is not made and, in order to suppress knocking of the engine 3, a correction to increase the target EGR gas amount EGROBJ is made (Step 42: YES, Steps 45 to 48). As the amounts of correction to the port injection ratio RPI and the target EGR gas amount EGROBJ, the port injection ratio correction term CORPI and the EGR correction term COEGR are respectively used. The longer a period in which knocking of the engine 3 is occurring becomes, the greater CORPI and COEGR become due to repeated addition of the addition terms CARPI and CAEGR, respectively (Steps 43 and 46). Furthermore, if the port injection ratio RPI to which a correction to increase the port injection ratio RPI has been made and the target EGR gas amount EGROBJ to which a correction to increase the target EGR gas amount EGROBJ has been made are lower than or equal to the corresponding upper limits RPILMH and EGRLMH, respectively (Steps 49 and 53: NO), the ignition timing IG is set at the temporary ignition timing IGTEM (Step 55).

On the other hand, if knocking of the engine 3 is not stopped by the above-described correction to increase the port injection ratio RPI or the target EGR gas amount EGROBJ and RPI or EGROBJ becomes higher than the corresponding upper limit RPILMH or EGRLMH due to the repeated correction to increase RPI or EGROBJ (Step 49 or 53: YES), the port injection ratio RPI or the target EGR gas amount EGROBJ is limited to the corresponding upper limit RPILMH or EGRLMH (Step 50 or 54). Moreover, in this case, a correction to retard the ignition timing IG is made as a result of the ignition timing IG being calculated as a value obtained by adding the ignition timing correction term COIG to the temporary ignition timing IGTEM (Step 52). The longer a period in which knocking of the engine 3 is occurring becomes, the greater the ignition timing correction term COIG which is the amount of correction to the ignition timing IG becomes due to repeated addition of the addition term CAIG (Step 51).

Furthermore, the correlation between various component elements in this embodiment and various component elements in the present disclosure is as follows. That is, the gasoline G and the ethanol E in this embodiment correspond to first and second fuels, respectively, in the present disclosure, and the first and second fuel tanks 21 and 22 in this embodiment correspond to first and second tanks, respectively, in the present disclosure. Moreover, the water temperature sensor 33 and the lubricating oil temperature sensor 35 in this embodiment correspond to an operating condition parameter obtaining unit in the present disclosure, and the first and second concentration sensors 39 and 40 in this embodiment correspond to first and second octane number obtaining units, respectively, in the present disclosure. In addition, the knock sensor 32 in this embodiment corresponds to a knocking detecting unit in the present disclosure, and the ECU 2 in this embodiment corresponds to a first level ratio obtaining unit (a first level ratio calculator of a first level ratio obtaining means), a second level ratio obtaining unit (a second level ratio calculator or a second level ratio obtaining means), an adjusting unit (an adjuster or an adjusting means), a knocking detecting unit, a controlling unit, an operating condition parameter obtaining unit, and a predetermined range setting unit in the present disclosure.

As described above, according to this embodiment, by multiplying the total fuel injection quantity QINJT by the port injection ratio RPI, the target port injection quantity QINJPI which is a target value of the port injection quantity is calculated (Step 56 of FIG. 6), and, by multiplying the total fuel injection quantity QINJT by a cylinder injection ratio which is a value obtained by subtracting the port injection ratio RPI from a value 1.0, the target cylinder injection quantity QINJDI which is a target value of the cylinder injection quantity is calculated (Step 58). Moreover, by dividing the detected gasoline level QRF1 by the predetermined full tank capacity of the first fuel tank 21, the gasoline level ratio RQRF1 is calculated, and, by dividing the detected ethanol level QRF2 by the predetermined full tank capacity of the second fuel tank 22, the ethanol level ratio RQRF2 is calculated.

Furthermore, when knocking of the engine 3 occurs (Step 8 of FIG. 3: YES), if the ethanol level ratio RQRF2 is higher than or equal to a value obtained by multiplying the gasoline level ratio RQRF1 by the predetermined ratio K (Step 42 of FIG. 5: NO), a correction to increase the port injection ratio RPI is made to suppress knocking (Steps 43 and 47). On the other hand, when knocking of the engine 3 occurs, if RQRF2 is lower than the value obtained by multiplying RQRF1 by K (Step 42 of FIG. 5: YES), a correction to increase the port injection ratio RPI to suppress knocking is not made (Steps 45 and 47) and a correction to increase the EGR gas to suppress knocking is made (Step 46).

As described above, when the ratio of RQRF2 to RQRF1, the ratio indicating the degree of deviation of the ethanol level ratio RQRF2 from the gasoline level ratio RQRF1, is lower than the predetermined ratio K, since RQRF2 is relatively low as compared to RQRF1, a correction to increase the port injection ratio RPI to suppress knocking is not made. As a result, by adjusting the cylinder injection ratio (1.0−RPI) and the port injection ratio RPI such that the ratio of RQRF2 to RQRF1 falls within a predetermined range defined by the predetermined ratio K, the consumption of the gasoline G is increased and the consumption of the ethanol E is curbed, whereby it is possible to maintain the gasoline level QRF1 and the ethanol level QRF2 at desired levels and thereby ensure desired operation performance of the engine 3.

Moreover, as described above, when knocking of the engine 3 occurs, since a correction to increase the EGR gas to suppress knocking is made when the ratio of RQRF2 to RQRF1 is lower than K, it is possible to suppress knocking properly. Furthermore, in order to suppress knocking, since the EGR gas is increased instead of retarding the ignition timing IG, it is possible to prevent a decrease in the combustion efficiency of the engine 3 caused as a result of the ignition timing IG being retarded.

Moreover, in the ranges in which the engine water temperature TW, the lubricating oil temperature TOIL, and the ambient temperature TA are relatively high, the higher TW is, the higher TOIL is, and the higher the ambient temperature TA is, the greater value to which the predetermined ratio K is set (Steps 71 to 73 and 77 of FIG. 7 and FIGS. 9 to 11). Each of the engine water temperature TW, the lubricating oil temperature TOIL, and the ambient temperature TA properly indicates the degree of the likelihood of occurrence of knocking of the engine 3. In the ranges in which TW, TOIL, and TA are relatively high, the higher TW is, the higher TOIL is, and the higher TA is, the higher the degree of the likelihood of occurrence of knocking of the engine 3 becomes. As a result, since it is possible to adjust the cylinder injection ratio and the port injection ratio RPI such that the higher the degree of the likelihood of occurrence of knocking is, the higher the ratio of the ethanol level ratio RQRF2 to the gasoline level ratio RQRF1 becomes and the ratio does not become too low, it is possible to curb the consumption of the ethanol E more effectively and thereby use the ethanol E for a longer period of time for suppressing knocking of the engine 3.

Incidentally, in place of the ambient temperature TA, the temperature of suction air that is sucked into the cylinder 3*a* may be used.

Furthermore, the degree of ethanol consumption CONSE indicating the degree of consumption of the ethanol E at each of different times is calculated (Step 81 of FIG. 8), and, by calculating an average of the sum total of a plurality of degrees of ethanol consumption CONSE calculated with different timing, the average degree of ethanol consumption AVECE is calculated (Step 82). Moreover, the higher the average degree of ethanol consumption AVECE is, that is, the higher the degree of consumption of the ethanol E represented by AVECE is, the greater value to which the predetermined ratio K is set (Step 77 of FIG. 7 and FIG. 13).

As a result, since it is possible to adjust the port injection ratio RPI such that the higher the degree of consumption of the ethanol E is, the higher the ratio of the ethanol level ratio RQRF2 to the gasoline level ratio RQRF1 becomes and the ratio does not become too low, it is possible to curb the consumption of the ethanol E more effectively and thereby use the ethanol E for a longer period of time for suppressing knocking of the engine 3. In this case, since the predetermined ratio K is set by using the average degree of ethanol consumption AVECE, not a single degree of ethanol consumption CONSE, it is possible to curb the consumption of the ethanol E properly in accordance with the average consumption tendency of the ethanol E in a certain length of period, not a temporary consumption tendency of the ethanol E.

Moreover, by the separating device 23, the ethanol E is generated by separating the ethanol component (the octane number component) from the gasoline G in the first fuel tank 21 and the generated ethanol E is supplied to the second fuel tank 22. As a result, the concentrations (the octane numbers) of the ethanol component in the gasoline G and the ethanol E are not always constant and change as time proceeds. Furthermore, the higher the detected first ethanol concentration EL1 is and the higher the detected second ethanol concentration EL2 is, the greater value to which the predetermined ratio K is set (Step 77 of FIG. 7 and FIGS. 14 and 15).

When the first or second ethanol concentrations EL1 or EL2 is high, the port injection quantity required to control the ethanol concentration of the fuel which is supplied to the inside of the cylinder 3*a* so as to be the required ethanol concentration EREQ is reduced. By setting the predetermined ratio K in accordance with the above-described first and second ethanol concentrations EL1 and EL2, since it is possible to adjust the port injection ratio RPI such that the higher EL1 or EL2 is, the higher the ratio of the ethanol level ratio RQRF2 to the gasoline level ratio RQRF1 becomes and the ratio does not become too low, it is possible to curb the consumption of the ethanol E more effectively and thereby use the ethanol E for a longer period of time for suppressing knocking of the engine 3.

Incidentally, the present disclosure is not limited to the embodiment described above and can be carried out in various modes. For example, in the embodiment, the predetermined ratio K is calculated by multiplying the basic value KBASE thereof by the first to sixth correction coefficients COK1 to COK6, but the predetermined ratio K may be calculated directly by searching a map in accordance with various parameters such as the engine water temperature TW. Moreover, in the embodiment, as a parameter for calculating the predetermined ratio K, the average degree of ethanol consumption AVECE is used, but the degree of ethanol consumption CONSE may be used instead. Furthermore, in the embodiment, as a parameter for calculating the predetermined ratio K, the engine water temperature TW, the lubricating oil temperature TOIL, the ambient temperature TA, the average degree of ethanol consumption AVECE, and the first and second ethanol concentrations EL1 and EL2 are used, but at least one of arbitrary five parameters of these six parameters may be omitted; alternatively, the predetermined ratio K may be set at a fixed value.

Moreover, in the embodiment, as a parameter indicating the degree of deviation of the ethanol level ratio RQRF2 from the gasoline level ratio RQRF1, the ratio of RQRF2 to RQRF1 (hereinafter referred to as a "gasoline reference level ratio") is used, but the extent to which RQRF2 is higher or lower than RQRF1 (hereinafter referred to as a "gasoline reference level difference") may be used instead. In that case, during the control for knocking, suspension of a correction to increase the port injection ratio RPI and execution of a correction to increase the EGR gas for suppressing knocking of the engine 3 are performed on the condition that the gasoline reference level difference is greater than a predetermined value (RQRF1−RQRF2>a predetermined value). Furthermore, as is the case with the predetermined ratio K, this predetermined value may be set in accordance with at least one of the above-described various parameters such as the engine water temperature TW; alternatively, this predetermined value may be set at a fixed value.

In addition, in the embodiment, an adjustment of the cylinder injection ratio and the port injection ratio RPI to make the gasoline reference level ratio fall within a predetermined range which is defined by the predetermined ratio K is made by suspending a correction to increase the port injection ratio RPI for suppressing knocking during the execution of the control for knocking; instead of suspending the correction or along with a suspension of the correction, the adjustment may be made by making a correction to decrease the port injection ratio RPI during the execution of the control for non-knocking. Also in this case, as a parameter indicating the degree of deviation of the ethanol level ratio RQRF2 from the gasoline level ratio RQRF1, in place of the gasoline reference level ratio, the gasoline reference level difference may be used.

Moreover, in the embodiment, the port injection ratio RPI and the cylinder injection ratio are adjusted such that the degree of deviation of the ethanol level ratio RQRF2 from the gasoline level ratio RQRF1, the degree of deviation represented by the gasoline reference level ratio, falls within a predetermined range which is defined by the predetermined ratio K (from the viewpoint of preventing the ethanol level ratio RQRF2 from becoming too low); instead, the port injection ratio RPI and the cylinder injection ratio may be adjusted such that the degree of deviation of RQRF1 from RQRF2 falls within a predetermined range (from the viewpoint of preventing the gasoline level ratio RQRF1 from becoming too low). Also in this case, as the degree of deviation of the gasoline level ratio RQRF1 from the ethanol level ratio RQRF2, one of the ratio of RQRF1 to RQRF2 and the extent to which RQRF1 is higher or lower than RQRF2 may be used. Furthermore, an adjustment of the cylinder injection ratio and the port injection ratio RPI in this case is made by further increasing the amount of correction to increase the port injection ratio RPI during the execution of the control for knocking and is made by making a correction to increase the port injection ratio RPI during the execution of the control for non-knocking.

In addition, in the embodiment, part of the combusted gas is caused to be present in the cylinder 3a as a result of the part of the combusted gas being made to flow back to the inlet passage 4 as the EGR gas by the EGR device 10 (external EGR), but part of the combusted gas may be caused to be present in the cylinder by so-called internal EGR. In this case, part of the combusted gas may be caused to remain in the cylinder as the EGR gas by opening an exhaust valve before the piston reaches TDC, or part of the combusted gas may be temporarily blown back into the inlet passage as the EGR gas by opening an induction valve before the piston reaches TDC and then made to flow into the cylinder during a subsequent intake stroke. Moreover, in the embodiment, a correction to increase the EGR gas is made to suppress knocking of the engine 3, but a correction to lower the amount of suction air of the engine 3 may be made or a correction to retard the ignition timing may be made.

Furthermore, in the embodiment, the gasoline G as the first fuel with a low octane number is injected from the cylinder injection valve 6 and the ethanol E as the second fuel with a high octane number is injected from the port injection valve 7; instead, the second fuel may be injected from the cylinder injection valve and the first fuel may be injected from the port injection valve. Alternatively, the first and second fuels may be injected from a single fuel injection valve.

Moreover, the embodiment is an example in which the present disclosure is applied to the engine 3 in which the ethanol E as the second fuel with a high octane number is generated by separating the ethanol component from the gasoline G as the first fuel with a low octane number by the separating device 23; the present disclosure is also applicable to an internal combustion engine in which the separating device is not provided and both the first and second fuels are supplied from the outside. In addition, in the embodiment, the first and second ethanol concentrations EL1 and EL2 are detected by the first and second concentration sensors 39 and 40, respectively, but the first and second ethanol concentrations EL1 and EL2 may be estimated in the manner described in paragraphs [0105] to [0108] of Japanese Patent Application No. 2015-095859 by the present applicant, the entire contents of which are incorporated herein by reference. Moreover, in the embodiment, knocking of the engine 3 is determined (detected) based on the detection signal of the knock sensor 32, but knocking of the engine 3 may be detected based on a detection signal of a cylinder pressure sensor that detects the pressure inside the cylinder. In addition to those described above, the details of the configuration may be changed or modified as appropriate within the spirit of the present disclosure.

A first aspect of the present disclosure is directed to a control device 1 of an internal combustion engine 3 in which a first fuel (gasoline G) stored in a first tank (a first fuel tank 21 in the embodiment; the same applies hereinafter) and a second fuel (ethanol E) whose octane number is higher than the octane number of the first fuel, the second fuel stored in a second tank (a second fuel tank 22), are used in combination, the control device 1 including: a first level ratio obtaining unit (an ECU 2) that obtains a first level ratio (a gasoline level ratio RUF1) which is the ratio of the level of the first fuel to a predetermined full tank capacity of the first tank; a second level ratio obtaining unit (the ECU 2) that obtains a second level ratio (an ethanol level ratio RQRF2)

which is the ratio of the level of the second fuel to a predetermined full tank capacity of the second tank; and an adjusting unit (the ECU 2, FIGS. 4 to 6) that adjusts a first fuel ratio (a value 1.0–a port injection ratio RPI) which is the ratio of the first fuel in a fuel which is supplied to the internal combustion engine 3 and a second fuel ratio (the port injection ratio RPI) which is the ratio of the second fuel in the fuel which is supplied to the internal combustion engine 3, in which the adjusting unit adjusts the first and second fuel ratios such that the degree of deviation, from one of the first and second level ratios, of the other of the first and second level ratios falls within a predetermined range (Steps 42, 43, 45, and 47 of FIG. 5 and Steps 56 to 59 of FIG. 6).

With this configuration, the first level ratio which is the ratio of the level of the first fuel to the full tank capacity of the first tank (the maximum value of the quantity of the first fuel that can be stored in the first tank) is obtained by the first level ratio obtaining unit, and the second level ratio which is the ratio of the level of the second fuel to the full tank capacity of the second tank (the maximum value of the quantity of the second fuel that can be stored in the second tank) is obtained by the second level ratio obtaining unit. Moreover, the first fuel ratio which is the ratio of the first fuel in the fuel which is supplied to the internal combustion engine and the second fuel ratio which is the ratio of the second fuel in the fuel which is supplied to the internal combustion engine are adjusted by the adjusting unit.

In general, the full tank capacities of the first and second tanks are set in advance to correspond to the necessary quantities of the first and second fuels that are required in the internal combustion engine. According to the present disclosure, unlike the existing control device described earlier, the first and second fuel ratios are adjusted such that the degree of deviation, from one of the first level ratio (the ratio between the level of the first fuel and the full tank capacity of the first tank) and the second level ratio (the ratio between the level of the second fuel and the full tank capacity of the second tank), of the other of the first and second level ratios falls within a predetermined range. As a result, it is possible to consume the first and second fuels properly, which makes it possible to maintain the levels of the first and second fuels at desired levels which correspond to the necessary quantities described above and thereby ensure desired operation performance of the internal combustion engine.

According to a second aspect of the present disclosure, in the control device 1 of the internal combustion engine 3 described in the first aspect, the degree of deviation may be a level difference which is the extent to which the second level ratio is higher or lower than the first level ratio, the control device 1 may further include: a knocking detecting unit (a knock sensor 32, the ECU 2, Step 8 of FIG. 3) that detects knocking of the internal combustion engine 3; and a controlling unit (the ECU 2) that performs knocking control which suppresses knocking of the internal combustion engine 3 by using the amount of operation other than the second fuel, and, when knocking of the internal combustion engine 3 is detected, if the level difference is greater than a predetermined value, the controlling unit may perform the knocking control (Steps 46 and 48 of FIG. 5) and the adjusting unit may not perform increase of the second fuel ratio for suppressing knocking of the internal combustion engine 3 (Steps 45 and 47 of FIG. 5 and Steps 56 and 57 of FIG. 6).

With this configuration, when knocking of the internal combustion engine is detected by the knocking detecting unit, if the level difference which is the extent to which the second level ratio is higher or lower than the first level ratio is greater than the predetermined value, the knocking control which suppresses knocking of the internal combustion engine is performed by the controlling unit by using the amount of operation other than the second fuel and increase of the second fuel ratio for suppressing knocking of the internal combustion engine, the increase performed by the adjusting unit, is stopped. As a result, when the second level ratio of the second fuel is relatively low, it is possible to suppress knocking of the internal combustion engine while curbing the consumption of the second fuel.

According to a third aspect of the present disclosure, in the control device 1 of the internal combustion engine 3 described in the second aspect, in the internal combustion engine 3, an EGR device 10 that causes part of a combusted gas to be present in a cylinder 3*a* of the internal combustion engine 3 as an EGR gas may be provided, and the controlling unit may perform the knocking control by increasing the EGR gas as the amount of operation (Steps 46 and 48 of FIG. 5).

With this configuration, since the knocking control which suppresses knocking of the internal combustion engine is performed by increasing the EGR gas, it is possible to suppress knocking properly. Moreover, in order to suppress knocking, instead of retarding the ignition timing of the internal combustion engine, since the EGR gas is increased, it is possible to prevent a decrease in the combustion efficiency of the internal combustion engine caused as a result of the ignition timing being retarded.

According to a fourth aspect of the present disclosure, the control device 1 of the internal combustion engine 3 described in any one of the first to third aspects may further include: an operating condition parameter obtaining unit (a water temperature sensor 33, a lubricating oil temperature sensor 35, the ECU 2) that obtains an operating condition parameter indicating an operating condition of the internal combustion engine 3; and a predetermined range setting unit (the ECU 2, Steps 71 to 74 and 77 of FIG. 7, FIGS. 8 to 13) that sets the predetermined range in accordance with the obtained operating condition parameter (an engine water temperature TW, a lubricating oil temperature TOIL, the average degree of ethanol consumption AVECE).

With this configuration, the predetermined range is set by the predetermined range setting unit in accordance with the operating condition parameter indicating the operating condition of the internal combustion engine. As a result, it is possible to consume the first and second fuels properly in accordance with the operating condition of the internal combustion engine and thereby maintain the levels of the first and second fuels at desired levels.

According to a fifth aspect of the present disclosure, in the control device 1 of the internal combustion engine 3 described in the fourth aspect which is described in the first aspect, the degree of deviation may be represented by a level ratio which is the ratio of the second level ratio to the first level ratio, the adjusting unit may adjust the first and second fuel ratios such that the level ratio does not become lower than a predetermined ratio K (Steps 42, 43, 45, and 47 of FIG. 5 and Steps 56 to 59 of FIG. 6), the operating condition parameter may include a degree-of-occurrence-of-knocking parameter (the engine water temperature TW, the lubricating oil temperature TOIL, the average degree of ethanol consumption AVECE) indicating the degree of the likelihood of occurrence of knocking of the internal combustion engine 3, and the predetermined range setting unit may set the predetermined ratio K in such a way that the higher the degree of the likelihood of occurrence of knocking of the internal combustion engine 3 is, the degree represented by the degree-of-occurrence-of-knocking parameter, the greater value to which the predetermined ratio K is set (Steps 71 to 74 and 77 of FIG. 7, FIGS. 8 to 13).

With this configuration, the first and second fuel ratios are adjusted such that the level ratio which is the ratio of the second level ratio to the first level ratio does not become lower than the predetermined ratio. Moreover, the operating condition parameter includes the degree-of-occurrence-of-knocking parameter indicating the degree of the likelihood of occurrence of knocking of the internal combustion engine, and, the higher the degree of the likelihood of occurrence of knocking of the internal combustion engine is, the degree represented by the degree-of-occurrence-of-knocking parameter, the greater value to which the predetermined ratio is set. As a result, since it is possible to adjust the first and second fuel ratios such that, the higher the degree of the likelihood of occurrence of knocking is, the higher the ratio of the second level ratio to the first level ratio becomes and the ratio does not become too low, it is possible to curb the consumption of the second fuel and thereby use the second fuel for a longer period of time for suppressing knocking of the internal combustion engine.

According to a sixth aspect of the present disclosure, in the control device 1 of the internal combustion engine 3 described in the fifth aspect, the degree-of-occurrence-of-knocking parameter may include at least one of a cooling water temperature (the engine water temperature TW) of the internal combustion engine 3 and the temperature of lubricating oil (the lubricating oil temperature TOIL) of the internal combustion engine 3.

With this configuration, since the degree-of-occurrence-of-knocking parameter includes at least one of the cooling water temperature of the internal combustion engine and the temperature of the lubricating oil of the internal combustion engine and each of these parameters properly indicates the degree of the likelihood of occurrence of knocking of the internal combustion engine, it is possible to obtain the effect of the fifth aspect of the present disclosure effectively.

According to a seventh aspect of the present disclosure, in the control device 1 of the internal combustion engine 3 described in the fifth or sixth aspect, the degree-of-occurrence-of-knocking parameter may include a degree-of-consumption-of-second-fuel parameter (the average degree of ethanol consumption AVECE) indicating the degree of consumption of the second fuel.

In the internal combustion engine in which the first fuel with a low octane number and the second fuel with a high octane number are used in combination, the second fuel is mainly used for suppressing knocking of the internal combustion engine. As a result, a high degree of consumption of the second fuel means that the degree of the likelihood that the internal combustion engine is operated by an operator in an operating condition under which knocking easily occurs is high. With the above-described configuration, since the degree-of-occurrence-of-knocking parameter includes the degree-of-consumption-of-second-fuel parameter indicating the degree of consumption of the second fuel, it is possible to adjust the first and second fuel ratios such that the higher the degree of the likelihood that the internal combustion engine is operated by the operator in an operating condition under which knocking easily occurs, the higher the ratio of the second level ratio to the first level ratio becomes and the ratio does not become too low, it is possible to curb the consumption of the second fuel and thereby use the second fuel for a longer period of time for suppressing knocking of the internal combustion engine.

According to an eighth aspect of the present disclosure, in the control device 1 of the internal combustion engine 3 described in the seventh aspect, the degree-of-occurrence-of-knocking parameter may include, as the degree-of-consumption-of-second-fuel parameter, an average value (the average degree of ethanol consumption AVECE) of the sum total of a plurality of the degree-of-consumption-of-second-fuel parameters obtained with different timing.

With this configuration, an average value of the sum total of a plurality of degree-of-consumption-of-second-fuel parameters obtained with different timing, not a single degree-of-consumption-of-second-fuel parameter obtained at each of different times, is included as the degree-of-occurrence-of-knocking parameter. Therefore, it is possible to adjust the first and second fuel ratios properly in accordance with the degree-of-occurrence-of-knocking parameter reflecting the average consumption tendency of the second fuel in a certain length of period, not a temporary tendency of consumption of the second fuel by the operator.

According to a ninth aspect of the present disclosure, in the control device 1 of the internal combustion engine 3 described in any one of the first to third aspects, in the internal combustion engine 3, a separating device 23 that generates the second fuel by separating an octane number component from the first fuel in the first tank and supplies the generated second fuel to the second tank may be provided, and the control device may further include: a first octane number obtaining unit (a first concentration sensor 39) that obtains a first octane number which is the octane number of the first fuel in the first tank; a second octane number obtaining unit (a second concentration sensor 40) that obtains a second octane number which is the octane number of the second fuel in the second tank; and a predetermined range setting unit (the ECU 2, Steps 75 to 77 of FIG. 7, FIGS. 14 and 15) that sets the predetermined range in accordance with at least one of the obtained first and second octane numbers (first and second ethanol concentrations EL1 and EL2).

With this configuration, by the separating device, the second fuel is generated by separating the octane number component from the first fuel in the first tank and the generated second fuel is supplied to the second tank. As a result, the octane numbers of the first and second fuels are not always constant and change as time proceeds. Moreover, the first octane number which is the octane number of the first fuel in the first tank is obtained by the first octane number obtaining unit, the second octane number which is the octane number of the second fuel in the second tank is obtained by the second octane number obtaining unit, and the predetermined range is set in accordance with at least one of the first and second octane numbers. As a result, it is possible to consume the first and second fuels properly in accordance with at least one of the first and second octane numbers that change as time proceeds and thereby maintain the levels of the first and second fuels at desired levels.

Obviously, numerous modifications and variations of the present invention are possible in light of the above teachings. It is therefore to be understood that within the scope of the appended claims, the invention may be practiced otherwise than as specifically described herein.

What is claimed is:
1. A control device for an internal combustion engine in which a first fuel stored in a first tank and a second fuel whose octane number is higher than an octane number of the first fuel, the second fuel stored in a second tank, are used in combination, the control device comprising:

a first level ratio obtaining unit configured to obtain a first level ratio which is a ratio of a level of the first fuel to a predetermined full tank capacity of the first tank;

a second level ratio obtaining unit configured to obtain a second level ratio which is a ratio of a level of the second fuel to a predetermined full tank capacity of the second tank; and an adjusting unit configured to adjust a first fuel ratio which is a ratio of the first fuel in a fuel which is supplied to the internal combustion engine and a second fuel ratio which is a ratio of the second fuel in the fuel which is supplied to the internal combustion engine, wherein the adjusting unit is configured to adjust the first and second fuel ratios based on a degree of deviation between the first level ratio and the second level ratio such that the degree of deviation falls within a predetermined range, and the control device is configured to control an injection valve based on the adjusted first fuel ratio or the adjusted second fuel ratio.

2. The control device according to claim 1, wherein the degree of deviation is a level difference which is an extent to which the second level ratio is higher or lower than the first level ratio, the control device further includes
a knocking detecting unit configured to detect knocking of the internal combustion engine, and
a controlling unit configured to perform knocking control which suppresses knocking of the internal combustion engine by using an amount of operation other than the second fuel, and when knocking of the internal combustion engine is detected, if the level difference is greater than a predetermined value, the controlling unit performs the knocking control and the adjusting unit does not perform increase of the second fuel ratio for suppressing knocking of the internal combustion engine.

3. The control device according to claim 2, wherein
in the internal combustion engine, an EGR device that causes part of a combusted gas to be present in a cylinder of the internal combustion engine as an EGR gas is provided, and
the controlling unit is configured to perform the knocking control by increasing the EGR gas as the amount of operation.

4. The control device according to claim 1, further comprising:
an operating condition parameter obtaining unit configured to obtain an operating condition parameter indicating an operating condition of the internal combustion engine; and
a predetermined range setting unit configured to set the predetermined range based on the obtained operating condition parameter.

5. The control device according to claim 4, wherein
the degree of deviation is represented by a level ratio which is a ratio of the second level ratio to the first level ratio,
the adjusting unit is configured to adjust the first and second fuel ratios such that the level ratio does not become lower than a predetermined ratio,
the operating condition parameter includes a degree-of-occurrence-of-knocking parameter indicating a degree of a likelihood of occurrence of knocking of the internal combustion engine, and the predetermined range setting unit is configured to set the predetermined ratio in such a way that the higher the degree of the likelihood of occurrence of knocking of the internal combustion engine is, the degree represented by the degree-of-occurrence-of-knocking parameter, the greater value to which the predetermined ratio is set.

6. The control device according to claim 5, wherein
the degree-of-occurrence-of-knocking parameter includes at least one of a cooling water temperature of the internal combustion engine and a temperature of lubricating oil of the internal combustion engine.

7. The control device according to claim 5, wherein
the degree-of-occurrence-of-knocking parameter includes a degree-of-consumption-of-second-fuel parameter indicating a degree of consumption of the second fuel.

8. The control device according to claim 7, wherein
the degree-of-occurrence-of-knocking parameter includes, as the degree-of-consumption-of-second-fuel parameter, an average value of a sum total of a plurality of the degree-of-consumption-of-second-fuel parameters obtained with different timing.

9. The control device according to claim 1, wherein
in the internal combustion engine, a separating device that generates the second fuel by separating an octane number component from the first fuel in the first tank and supplies the generated second fuel to the second tank is provided, and the control device further includes
a first octane number obtaining unit configured to obtain a first octane number which is the octane number of the first fuel in the first tank,
a second octane number obtaining unit configured to obtain a second octane number which is the octane number of the second fuel in the second tank, and
a predetermined range setting unit configured to set the predetermined range in accordance with at least one of the obtained first and second octane numbers.

10. A control device for an internal combustion engine, the control device comprising:
an engine control unit being configured to:
calculate a first level ratio of an amount of a first fuel stored in a first tank to a full tank capacity of the first tank;
calculate a second level ratio of an amount of a second fuel stored in a second tank to a full tank capacity of the second tank, an octane number of the second fuel being higher than an octane number of the first fuel;
adjust a first fuel ratio of the first fuel in a supplied fuel which is supplied to the internal combustion engine and a second fuel ratio of the second fuel in the supplied fuel based on a degree of deviation between the first level ratio and the second level ratio such that the degree of deviation is within a predetermined range; and
control an injection valve based on the adjusted first fuel ratio or the adjusted second fuel ratio.

11. The control device according to claim 10, wherein
the degree of deviation is a level difference which is an extent to which the second level ratio is higher or lower than the first level ratio, the control device further comprises a knocking detecting sensor configured to detect knocking of the internal combustion engine, the engine control unit is configured to perform knocking control which suppresses knocking of the internal combustion engine by using an amount of operation other than the second fuel, and when knocking of the internal combustion engine is detected, if the level difference is greater than a predetermined value, the control device performs the knocking control and does not perform increase of the second fuel ratio for suppressing knocking of the internal combustion engine.

12. The control device according to claim 11, wherein in the internal combustion engine, an EGR device that causes part of a combusted gas to be present in a cylinder of the internal combustion engine as an EGR gas is provided, and the engine control unit performs the knocking control by increasing the EGR gas as the amount of operation.

13. The control device according to claim 10, further comprising:

an operating condition parameter obtaining sensor configured to obtain an operating condition parameter indicating an operating condition of the internal combustion engine, wherein the engine control unit is configured to set the predetermined range based on the obtained operating condition parameter.

14. The control device according to claim 13, wherein the degree of deviation is represented by a level ratio which is a ratio of the second level ratio to the first level ratio, the engine control unit is configured to adjust the first and second fuel ratios such that the level ratio does not become lower than a predetermined ratio, the operating condition parameter includes a degree-of-occurrence-of-knocking parameter indicating a degree of a likelihood of occurrence of knocking of the internal combustion engine, and the engine control unit is configured to set the predetermined ratio in such a way that the higher the degree of the likelihood of occurrence of knocking of the internal combustion engine is, the degree represented by the degree-of-occurrence-of-knocking parameter, the greater value to which the predetermined ratio is set.

15. The control device according to claim 14, wherein the degree-of-occurrence-of-knocking parameter includes at least one of a cooling water temperature of the internal combustion engine and a temperature of lubricating oil of the internal combustion engine.

16. The control device according to claim 14, wherein the degree-of-occurrence-of-knocking parameter includes a degree-of-consumption-of-second-fuel parameter indicating a degree of consumption of the second fuel.

17. The control device according to claim 16, wherein the degree-of-occurrence-of-knocking parameter includes, as the degree-of-consumption-of-second-fuel parameter, an average value of a sum total of a plurality of the degree-of-consumption-of-second-fuel parameters obtained with different timing.

18. The control device according to claim 10, wherein in the internal combustion engine, a separating device that generates the second fuel by separating an octane number component from the first fuel in the first tank and supplies the generated second fuel to the second tank is provided, the control device further comprises;

a first sensor configured to obtain a first octane number which is the octane number of the first fuel in the first tank; and a second sensor configured to obtain a second octane number which is the octane number of the second fuel in the second tank, and the engine control unit is configured to set the predetermined range in accordance with at least one of the obtained first and second octane numbers.

19. The control device according to claim 10, wherein the first fuel and the second fuel are used in combination in the internal combustion engine.

20. A control device for an internal combustion engine, the control device comprising:

a first level ratio obtaining means for calculating a first level ratio of an amount of a first fuel stored in a first tank to a full tank capacity of the first tank;

a second level ratio obtaining means for calculating a second level ratio of an amount of a second fuel stored in a second tank to a full tank capacity of the second tank, an octane number of the second fuel being higher than an octane number of the first fuel; and an adjusting means for adjusting a first fuel ratio of the first fuel in a supplied fuel which is supplied to the internal combustion engine and a second fuel ratio of the second fuel in the supplied fuel based on a degree of deviation between the first level ratio and the second level ratio such that the degree of deviation is within a predetermined range, wherein the control device is configured to control an injection valve based on the adjusted first fuel ratio or the adjusted second fuel ratio.

* * * * *